US007845250B2

(12) United States Patent
Black et al.

(10) Patent No.: US 7,845,250 B2
(45) Date of Patent: Dec. 7, 2010

(54) TRANSMISSION APPARATUS

(75) Inventors: Richard Black, Liberty, SC (US); Todd W Corwin, Liberty, SC (US); Stewart Hamilton, Liberty, SC (US)

(73) Assignee: Richmond Gear, Inc., Liberty, SC (US)

( * ) Notice: Subject to any disclaimer, the term of this patent is extended or adjusted under 35 U.S.C. 154(b) by 614 days.

(21) Appl. No.: 11/799,455

(22) Filed: May 1, 2007

(65) Prior Publication Data

US 2008/0041176 A1 Feb. 21, 2008

Related U.S. Application Data

(60) Provisional application No. 60/796,742, filed on May 1, 2006.

(51) Int. Cl.
*F16H 3/38* (2006.01)
*F16D 13/00* (2006.01)

(52) U.S. Cl. ..................... 74/339; 192/53.34

(58) Field of Classification Search ................... 74/339, 74/325, 329, 333, 334; 192/53.34, 69.8, 192/108
See application file for complete search history.

(56) References Cited

U.S. PATENT DOCUMENTS

| | | | | |
|---|---|---|---|---|
| 2,620,907 A | * | 12/1952 | Wickberg | 477/83 |
| 3,080,028 A | * | 3/1963 | Kennedy | 192/53.343 |
| 4,084,451 A | * | 4/1978 | Ward | 477/69 |
| 4,315,564 A | * | 2/1982 | Numazawa et al. | 192/53.34 |
| 4,776,228 A | * | 10/1988 | Razzacki et al. | 74/339 |
| 4,811,825 A | | 3/1989 | Christian et al. | |
| 4,856,375 A | | 8/1989 | Beim | |
| 6,027,422 A | * | 2/2000 | Yamazaki | 475/231 |
| 6,276,224 B1 | | 8/2001 | Ueda et al. | |
| 6,514,173 B2 | | 2/2003 | Suzuki | |
| 6,533,091 B1 | | 3/2003 | Kawada et al. | |
| 6,776,062 B2 | | 8/2004 | Sunaga et al. | |
| 6,779,417 B2 | | 8/2004 | Ishihara et al. | |
| 6,895,832 B2 | | 5/2005 | Ishihara et al. | |
| 6,899,577 B2 | | 5/2005 | Yasuda et al. | |
| 6,994,196 B2 | * | 2/2006 | Shimura | 192/53.343 |

* cited by examiner

*Primary Examiner*—Roger Pang
(74) *Attorney, Agent, or Firm*—David J. Archer

(57) ABSTRACT

A transmission apparatus includes a rotatable drive shaft having a first a second end, the second end of the drive shaft defining a taper and a first portion of a dogtooth device. A rotatable driven shaft has a first and a second extremity, the driven shaft being selectively driven by the drive shaft, the driven shaft defining a spline. A slider drivingly cooperates with the spline, the slider being slidably secured to the driven shaft. A second portion of the dogtooth device is secured to the slider such that selective engagement of the first and second portions of the dogtooth device is permitted. A synchro ring defines a tapered bore, the ring being anchored within the slider such that when the slider is moved towards the taper of the drive shaft, the tapered bore of the ring cooperates with the taper of the drive shaft so that the ring and the slider anchored thereto are rotated and so that the first and second portions of the dogtooth device engage such that the driven shaft is driven by the drive shaft.

7 Claims, 7 Drawing Sheets

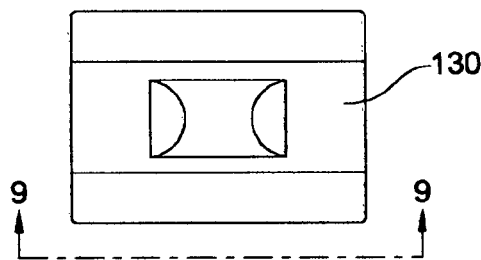 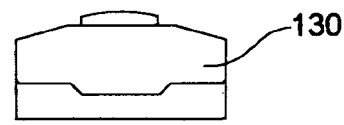
FIG. 8  FIG. 10
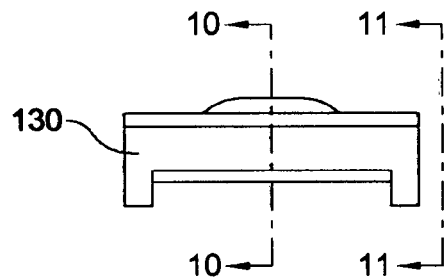 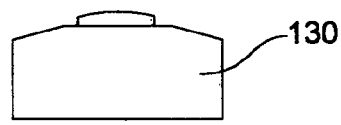
FIG. 9  FIG. 11
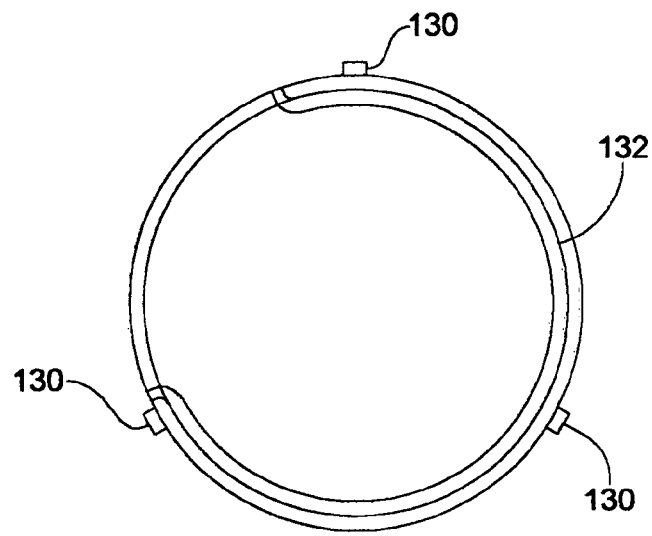
FIG. 12

TRANSMISSION APPARATUS

CROSS REFERENCE TO RELATED APPLICATION

The present application is a Complete application pursuant to Provisional application U.S. Ser. No. 60/796,742 filed May 1, 2006. All of the disclosure of the aforementioned provisional application is incorporated herein by reference.

BACKGROUND OF THE INVENTION

1. Field of the Invention

The present invention relates to a mechanical shifting transmission system for use in a transmission. More specifically, the present invention relates to a transmission involving a hybrid synchronizing/shifting system to avoid any harsh shift engagement during mechanical shifting of the transmission.

2. Background Information

Automotive transmissions have for many years used fully synchronizing systems. The synchronization of rotational speeds of the driving and the driven gears is of vital importance for the smooth transmission of power and enhanced life and reliable performance of the mating gears. Thus conventional transmission systems as used in automobiles are known to have a synchro ring, usually made of a brass type material. The synchro ring engages with the gear cone seat on the transmission gear during shifting. The synchro ring engages the gear cone seat during shifting to either speed up or slow down the gear that it is engaging so that a smooth transmission is achieved avoiding harsh engagement and achieving a smooth transmission. In some newer transmissions, the synchro ring includes a combination of metal and a composite material on the inside surface. The synchro ring of either type performs the same function which is to up-shift or down-shift gear engagements without grinding of the gear clutch teeth and slider.

In high performance or racing transmissions, the different gear selection is presently known to be achieved by a face shift or dogtooth arrangement. Such dogtooth arrangement when used in isolation provides no synchronization when up or down shifting gears to effect speed/RPM variation. However, such dogtooth arrangement is preferred in racing because the driver can shift rapidly without using the clutch. Nevertheless, the major deficiency in such systems is that the engagement of the dog teeth with the slider is very harsh, subjecting the dogteeth to rapid wear so that the dog tooth and the slider need to be replaced too frequently.

Accordingly, the present invention is directed to a mechanical shifting transmission which avoids such problems associated with rapid wear of dog teeth and/or slider and its frequent replacement.

The present invention thus provides for a mechanical shifting transmission having forward and reverse actuation without any hydraulic pump or clutches and yet avoids undesired harsh shock loading engagement.

More specifically, the present invention makes use of a hybrid synchronization/shifting system for transmission, wherein a selective combination of a synchro ring as well as a dogtooth arrangement is provided to achieve smooth shifting transmission avoiding any harsh engagement thus providing a more efficient mechanical transmission.

Importantly, the transmission system of the present invention achieves the required synchronization of the slider and the gear RPM that enables the face tooth engagement to be less harsh with minimum shock load and thus enhancing the working life of the mating teeth/surfaces.

Thus the primary feature of the present invention is to provide a hybrid synchronized gear shifting arrangement for use in a transmission, for smooth power transmission with forward and reverse speed variation.

Another important feature of the present invention is to make advantageous selective use of both synchro rings and also a dogtooth arrangement to achieve a smooth shifting/transmission in a transmission application avoiding much of the shock load and resultant wear and tear of the related components.

A further important feature of the present invention, is the provision of a hybrid transmission system specifically adapted to synchronize the slider RPM with the speed gear RPM thereby avoiding problems of dog teeth and/or slider wear and frequent replacement.

Another feature of the present invention is to provide a simple, efficient and extended life of a transmission thereby avoiding mechanical failures by avoiding any harsh shock load and engagement of the slider and the speed gear which is normally experienced in the use of conventional dogtooth arrangement based transmission systems.

Other features and advantages of the present invention will be readily apparent to those skilled in the art by a consideration of the detailed description of a preferred embodiment of the present invention contained herein.

SUMMARY OF THE INVENTION

The present invention relates to a transmission apparatus. The apparatus includes a rotatable drive shaft having a first a second end, the second end of the drive shaft defining a taper and a first portion of a dogtooth device. A rotatable driven shaft has a first and a second extremity, the driven shaft being selectively driven by the drive shaft, the driven shaft defining a spline. A slider drivingly cooperates with the spline, the slider being slidably secured to the driven shaft. A second portion of the dogtooth device is secured to the slider such that selective engagement of the first and second portions of the dogtooth device is permitted. A synchro ring defines a tapered bore, the ring being anchored within the slider such that when the slider is moved towards the taper of the drive shaft, the tapered bore of the ring cooperates with the taper of the drive shaft so that the ring and the slider anchored thereto are rotated and so that the first and second portions of the dogtooth device engage such that the driven shaft is driven by the drive shaft.

More specifically, the present invention includes a hybrid synchronizing/shifting transmission system for application in a transmission. The transmission of the present invention includes a selective combination of at least one synchro ring and a dogtooth arrangement wherein the synchro ring provides synchronization of the slider RPM to the gear RPM for up-shifting or down-shifting. The synchro ring is manufactured from brass or a combination of brass and a composite material on the inside surface.

Importantly, the synchro ring is arranged such that it synchronizes the face tooth engagement of the slider and the speed gear both during forward and reverse actuation.

To facilitate such synchronization involving the synchro ring and a dogtooth arrangement, the gear includes a gear cone seat member having a taper region adapted to contact a corresponding tapered bore in the synchro ring when the slider output shaft RPM tries to match with the gear RPM thereby avoiding the problem of a harsh shock loading engagement between the slider and the gear. The transmission as above is actuated through key means adapted to force the synchro ring onto the taper region of the gear cone member.

The key means is retained in position by a groove in the slider and is held in place by a spring such that when the slider travels towards the gear to be engaged, the keys move with the slider and force the synchro ring onto the taper region of the gear cone member when the slider output shaft RPM adjusts to the gear RPM for synchronized up-shifting or down-shifting. In particular, the keys are held in between two synchro rings having tapered bores and are forced onto the taper region of the gear cone.

In a more specific embodiment of the transmission according to the present invention, the transmission includes a hub which retains two synchro rings having tapered bores and splined to the output shaft. The synchro rings thus provided are adapted to synchronize the face tooth engagement of a slider and a speed gear. The gear includes a gear cone member having a taper region which corresponds to the tapered bore of the synchro ring. The key means according to such embodiment is retained in position by a groove in a slider and is adapted to force the synchro ring onto the taper region of the gear cone member such that when the transmission is in neutral, the slider, hub and output shaft remain stationary and when the transmission is engaged, the slider is shifted towards the gear to be engaged. The keys then move with the slider and force the synchro ring onto the taper region of the gear cone member with the keys held between the two synchro rings having tapered bores forcing the rings onto the taper region of the gear cone for synchronized face tooth engagement of a slider and a speed gear. According to one aspect the present invention, the slider retains three such keys with a shift fork means provided for effecting the slider shifting to achieve the synchronized shifting of the hybrid shifting/transmission system.

The hybrid transmission/shifting system of the present invention is for specific advantageous use in a transmission application where minimizing the shock loading and harshness of the engagement between the slider and the gear is a requirement. The hybrid system of the present invention thus achieves a smooth engagement of the slider and the speed gear thereby minimizing the shock load and thus providing a reduction in the wear and tear of mating components.

The present invention thus achieves a mechanical shifting transmission having forward and reverses actuation without use of any hydraulic pump or clutches while avoiding any harsh face tooth engagement of the slider and speed gear.

Advantageously, in the hybrid transmission of the present invention, using the synchro ring and the dogtooth arrangement with the spring loaded keys ensures that the slider/output shaft RPM matches the gear RPM and thus allows a smooth face tooth engagement of the slider and speed gear.

Many modifications and variations in the present invention will be readily apparent to those skilled in the art by consideration of the detailed description with particular reference to the annexed drawings that show a preferred embodiment of the present invention. However, such modifications and variations fall within the spirit and scope of the present invention as defined by the appended claims.

BRIEF DESCRIPTION OF THE DRAWINGS

FIG. 8 is a side elevational view of one of the keys shown in FIG. 3.

FIG. 9 is a view taken on line 9-9 of FIG. 8.

FIG. 10 is a sectional view taken on the line 10-10 of FIG. 9.

FIG. 11 is a sectional view taken on the line 11-11 of FIG. 9; and

FIG. 12 is a side elevational view on a reduced scale relative to FIGS. 8-11 and shows the spring shown in FIG. 3.

Similar reference characters refer to similar parts throughout the views of the drawings.

DETAILED DESCRIPTION OF THE DRAWINGS

Figure 1:
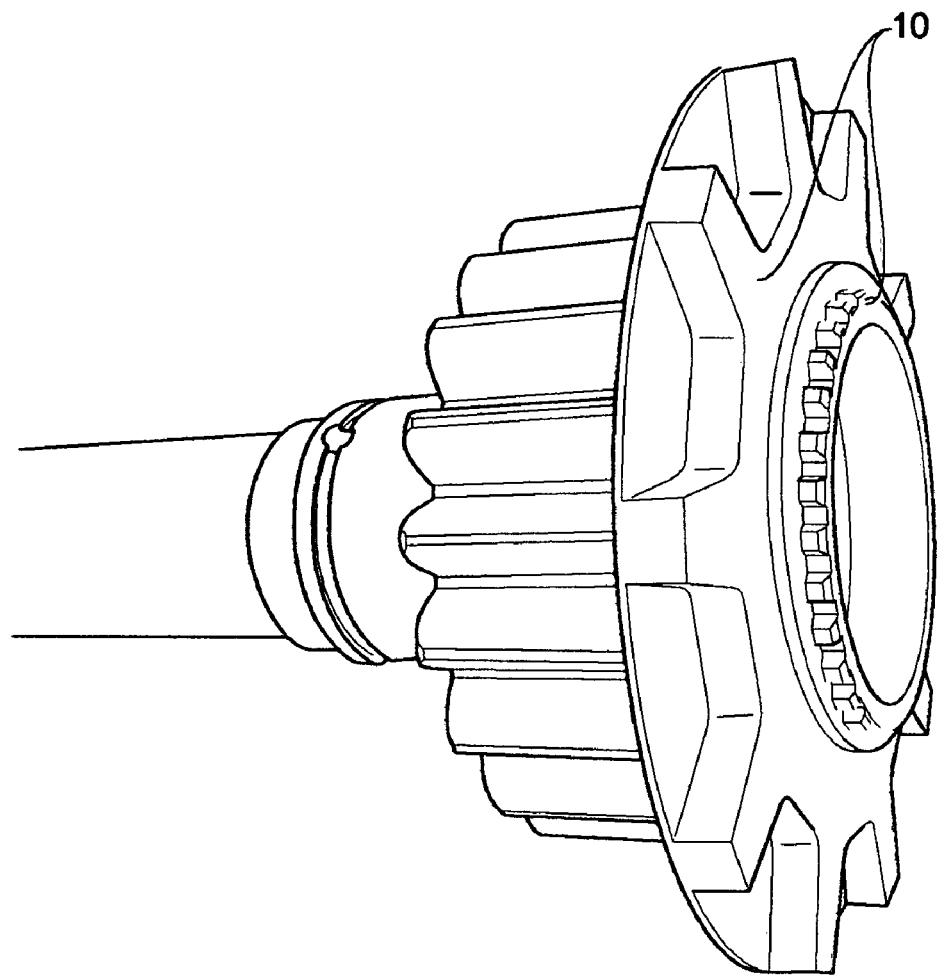
FIG. 1 shows a prior art face shift or dogtooth arrangement known to be provided for attaining different gear selection in performance transmissions or racing transmissions.

FIG. 1 shows a prior art face shift or dogtooth 10 arrangement known to be provided for attaining different gear selection in performance transmissions or racing transmissions.

Figure 2:
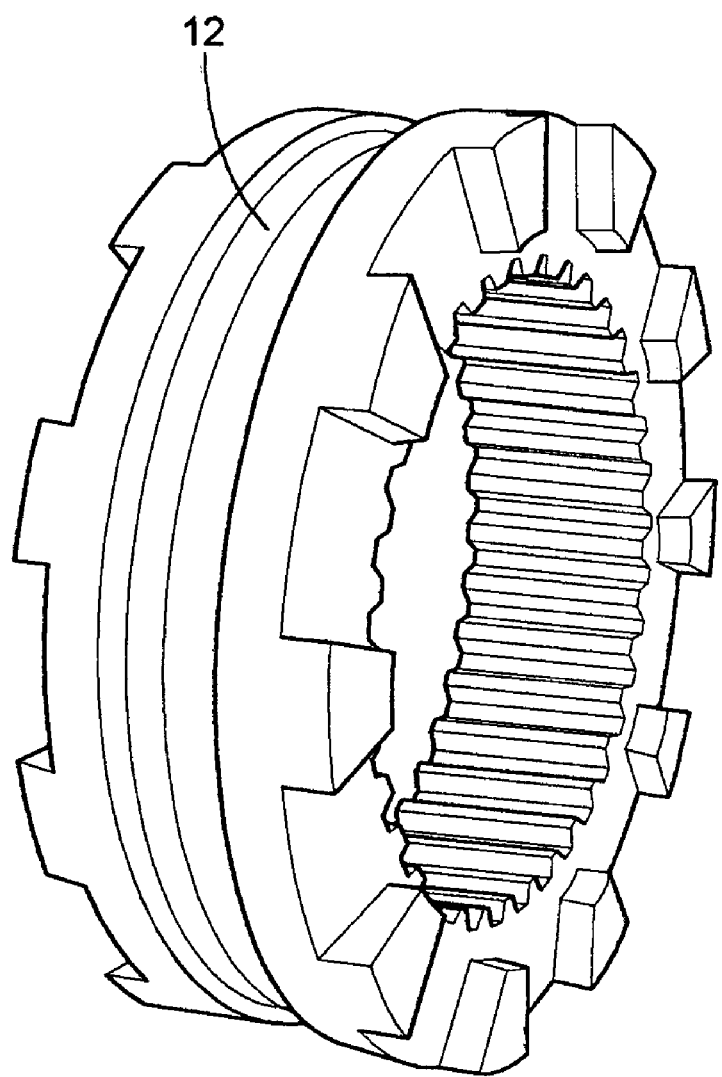
FIG. 2 is a perspective view of a slider element.

FIG. 2 is a perspective view of a prior art slider element. As shown in FIG. 2, the slider element 12 is adapted to coordinate with such face shift/dog tooth 10 shown in FIG. 1. Those skilled in the art will appreciate from the above that such face shift/dogtooth arrangement 10 offers no synchronization when effecting up-shifting or down-shifting. However, such face shift/dogtooth arrangement 10 is preferred in racing because in such an application, the driver is required to shift rapidly without using the clutch. However, such an arrangement necessarily leads to a very harsh engagement which in turn causes rapid wear to the face shift/dogtooth 10 and consequently, the frequent replacement of the dog tooth 10 and the slider 12.

Importantly, the use of such simple face shift/dogtooth arrangement in a transmission is found to have some associated problems in that the harsh engagement between the slider 12 and the gear causes rapid wear and damage to the operative integrating components. Therefore, the provision of a mechanical shifting mechanism without any hydraulic pump or clutch results in frequent maintenance and replacement of fast wearing operative components.

The present invention is thus directed to overcome the aforementioned limitations and drawbacks of transmissions involving a simple face shift/dogtooth arrangement 10. The transmission of the present invention which involves a hybrid synchronizing/shifting system is described in detail as follows.

Figure 3:
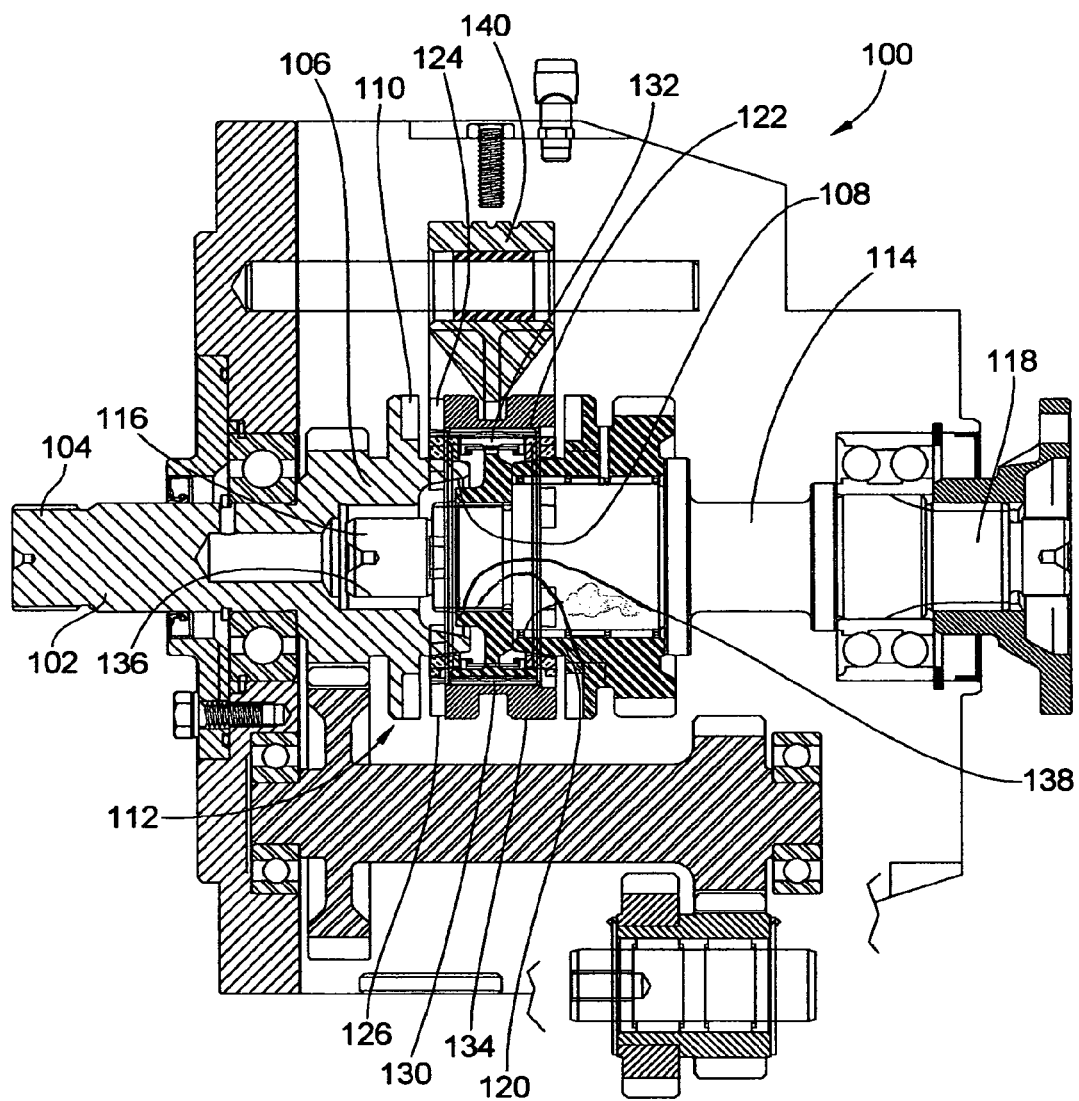
FIG. 3 is a sectional view of a transmission apparatus according to the present invention.

FIG. 3 is a sectional view of the transmission apparatus generally designated 100 according to the present invention. As shown in FIG. 3, the apparatus 100 includes a rotatable drive shaft 102 having a first and a second end 104 and 106 respectively, the second end 106 of the drive shaft 102 defining a taper 108. The second end 106 also defines a first portion 110 of a dogtooth device generally designated 112. A rotatable driven shaft 114 has a first and a second extremity 116 and 118 respectively. The driven shaft 114 is selectively driven by the drive shaft 102, the driven shaft 114 defining a spline 120.

A slider 122 drivingly cooperates with the spline 120, the slider 122 being slidably secured axially to the driven shaft 114. A second portion 124 of the dogtooth device 112 is secured to the slider 122 such that selective engagement of the first and second portions 110 and 124 respectively of the dogtooth device 112 is permitted. A synchro ring 126 defines a tapered bore 128 shown in more detail in FIG. 4. The ring 126 is anchored within the slider 122 such that when the slider 122 is moved axially towards the taper 108 of the drive shaft 102, the tapered bore 128 of the ring 126 cooperates with the taper 108 of the drive shaft 102 so that the ring 126 and the slider 122 anchored thereto are rotated and so that the first and second portions 110 and 124 of the dogtooth device 112 engage such that the driven shaft 114 is driven by the drive shaft 102.

As shown in FIG. 3, in order to achieve the aforementioned synchronization, the first extremity 116 of the driven shaft 114 retains the brass synchro ring 126 When the transmission is in neutral, the slider 122, the first extremity 116 and the driven output shaft 114 are stationary and are thus not turning. When the transmission is engaged, the hybrid synchronizing/shifting is activated by first providing contact of the brass synchro ring bore 128 with the matching taper 108 of the drive shaft 102. This is achieved by pushing the brass ring 126 onto the gear cone taper 108. Once the contact between the synchro ring 126 and the gear cone taper 108 is established, the slider 122 and the output shaft RPM (driven shaft 114) tries to match the gear RPM (drive shaft 102) for a less harsh shifting and integration for improved performance.

As shown in FIG. 3, the second end 106 of the drive shaft 102 defines a bore 136 for the rotatable reception therein of the first extremity 116 of the driven shaft 114.

Also, the spline 120 extends axially between the first and second extremities 116 and 118 respectively of the driven shaft 114.

Additionally, the slider 122 defines a further spline 138 which slidably cooperates with the spline 120 of the driven shaft 114.

Furthermore, the slider 122 defines a groove 134 which is disposed coaxially relative to the driven shaft 114.

A fork shift 140 slidably cooperates with the groove 134 for selectively moving the slider 122 axially relative to the second end 106 of the drive shaft 102.

The keys 130 are disposed between the slider 122 and the ring 126 such that when the slider 122 is moved axially towards the second end 106 of the drive shaft 102, the keys 130 press the tapered bore 128 of the ring 126 against the taper 108 of the drive shaft 102.

Also the spring 132 is used for urging keys 130 towards the ring 126.

Figure 4:
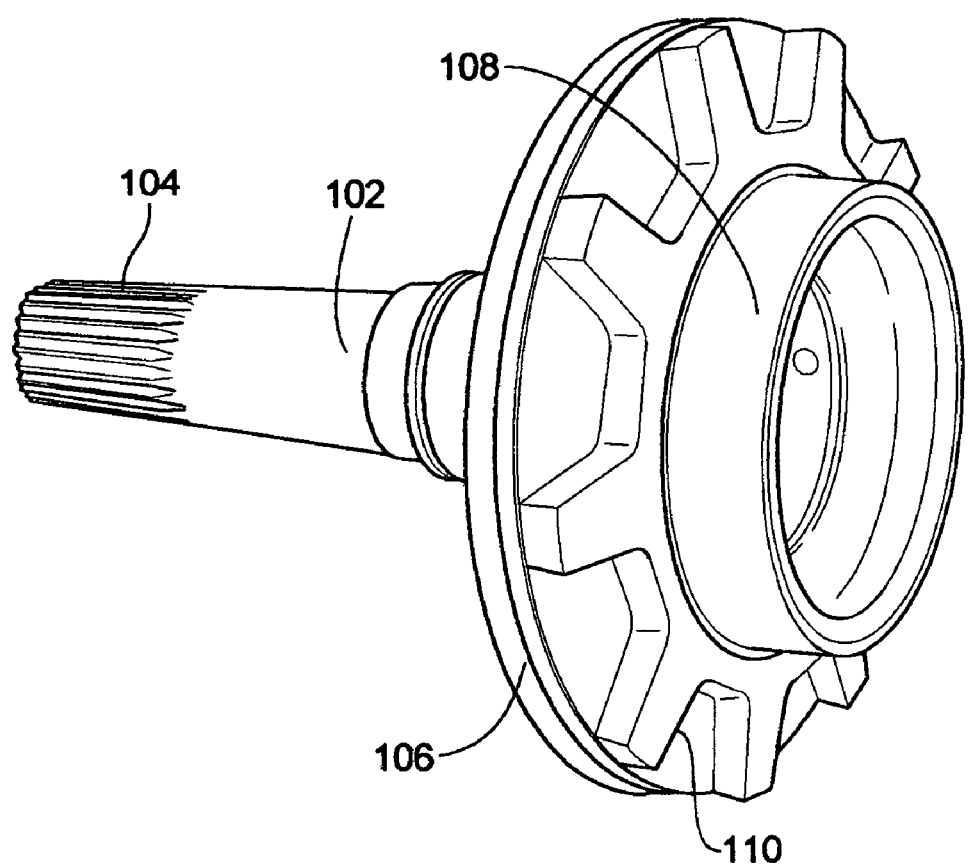
FIG. 4 is a perspective view of the drive shaft shown in FIG. 3.

FIG. 4 is a perspective view of the drive shaft. As shown in FIG. 4, the drive shaft 102 has a first and second end 104 and 106 with the second end 106 defining a taper 108. The taper 108 is a cone shaped member which is used in the transmission of the present invention. As shown in the FIG. 4, the taper 108 is specifically dimensioned and arranged to match the tapered bore 128 of the synchro ring 126 used in the hybrid synchronizing/shifting system of the present invention.

Figure 5:
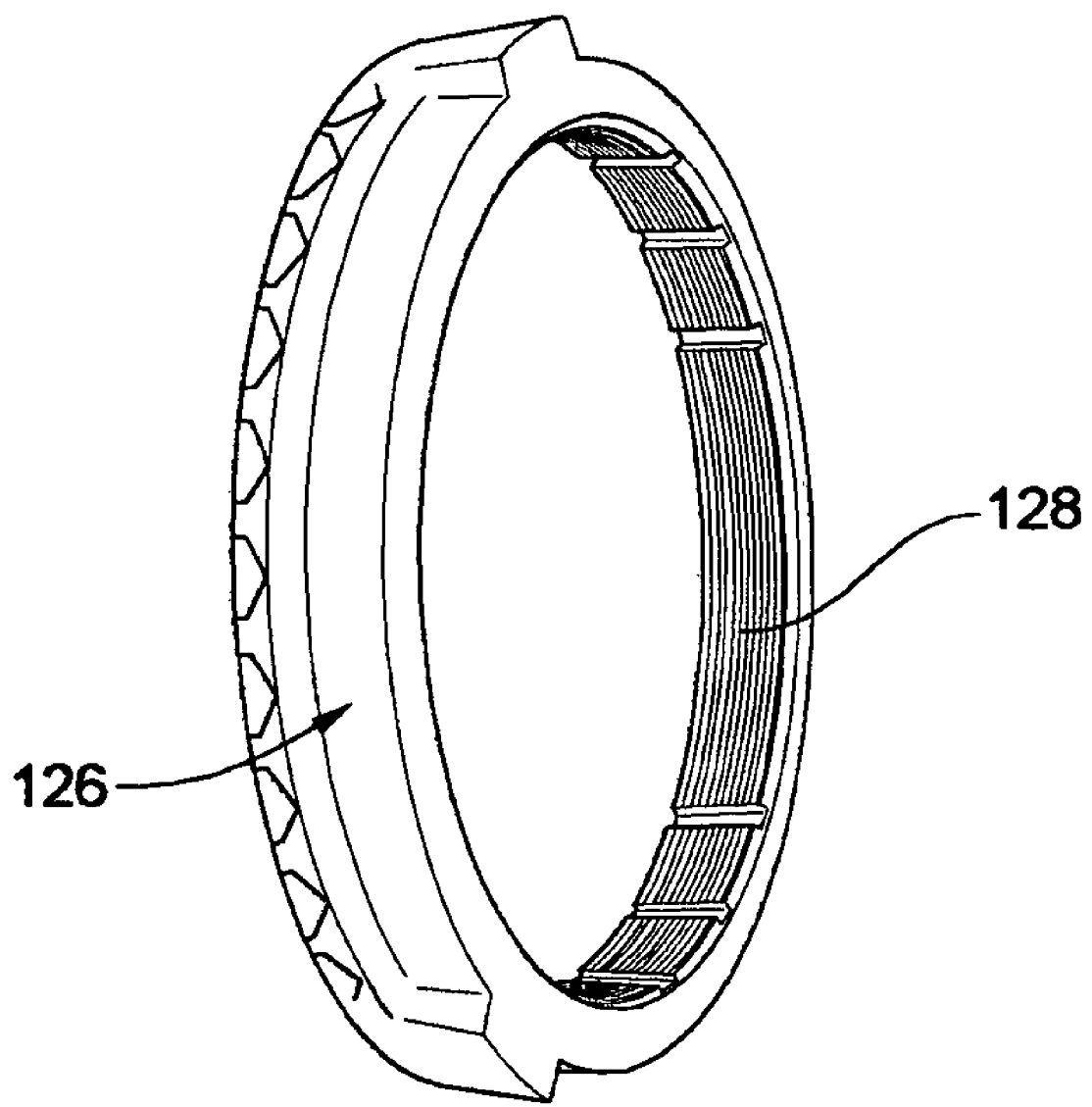
FIG. 5 is a perspective view of a synchro ring according to the present invention.

FIG. 5 is a perspective view of the synchro ring according to the present invention. As shown in FIG. 5, the synchro ring 126 provided in the hybrid system of the present invention is basically fabricated from of a brass type material. However, it is also possible to have the synchro ring 126 fabricated from a combination of metal and a composite material on the inside. Importantly, the synchro ring 126 is adapted to engage the taper 108 on the second end 106 of the drive shaft 102 as shown in FIG. 4. The tapered bore 128 of the synchro ring 126 is arranged to engage the taper 108 during shifting to either speed up or speed down the gear that it engages so as to achieve a smooth transition.

FIGS. 3-5 illustrate an assembly of the transmission in accordance with the present invention and includes a hybrid synchronization/shifting.

Figure 6:
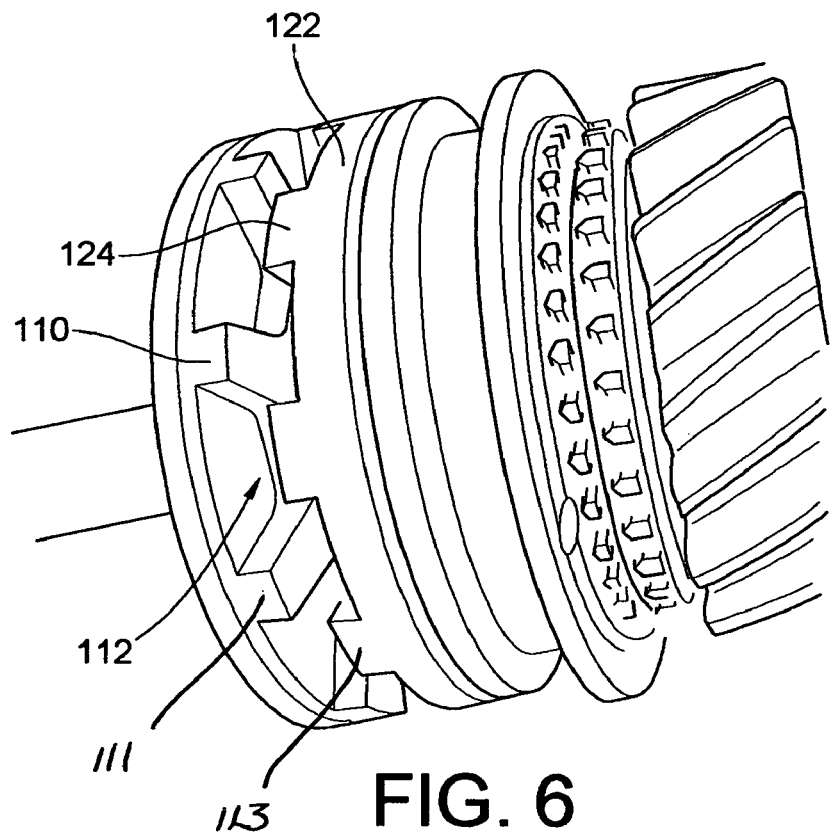
FIG. 6 is a perspective view of the transmission assembly shown in FIGS. 3-5 when in neutral.
Figure 7:
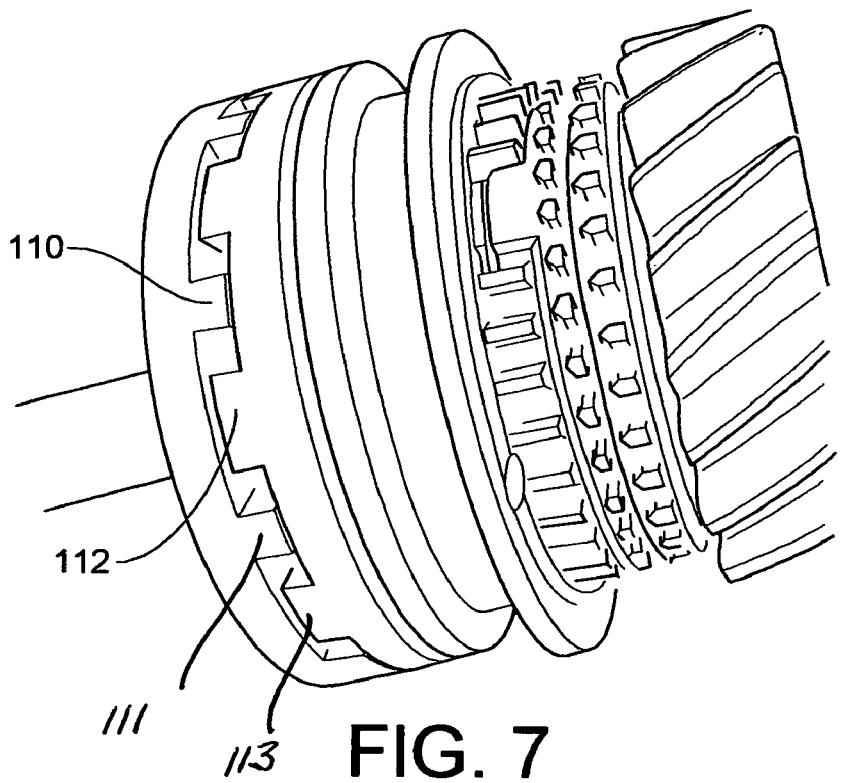
FIG. 7 is a perspective view of the transmission assembly shown in FIGS. 3-5 when engaged.

Operation of the hybrid system involving the face shift 112 and the synchro ring 126 is directed specifically to avoid harsh engagement of face tooth 111 with further face tooth 113 as shown in FIGS. 6 and 7, of the slider 122 with the drive shaft 102. Importantly, in the hybrid system of the present invention, the harsh face tooth 111 and 113 engagement/loading is avoided by providing the hybrid combination of the synchro ring 126 and the dog tooth 112 and in particular by synchronizing the slider 122 RPM to the drive shaft 102 RPM. Such RPM synchronization is the key to minimizing shock loading and harsh engagement between the slider 122 and the drive shaft 102.

FIG. 6 is a perspective view of the transmission assembly shown in FIGS. 3-5. As shown in FIG. 6, the slider 122 is in the neutral position so that the first a second portions 110 and 124 are not engaged.

FIG. 7 is a perspective view of the transmission assembly shown in FIGS. 3-5. As shown in FIG. 7, the slider has been moved axially towards the drive shaft 102 and shows the second portion 124 engaged with the first portion 110. Importantly, such synchronized shifting is achieved by the combination of keys 130 and the synchro spring 132 arrangement shown in FIG. 3.

FIG. 8 is a side elevational view of one of the keys 130 shown in FIG. 3.

FIG. 9 is a view taken on line 9-9 of FIG. 8.

FIG. 10 is a sectional view taken on the line 10-10 of FIG. 9.

FIG. 11 is a sectional view taken on the line 11-11 of FIG. 9.

As shown in FIGS. 8-11 the keys are dimensioned to be disposed within the slider 122 for urging the ring 126 axially.

FIG. 12 is a side elevational view on a reduced scale relative to FIGS. 8-11 and shows the spring 132 shown in FIG. 3. As shown in FIG. 12, the three keys 130 are spaced circumferentially such that when the slider 122 moves axially, the spring 132 and keys 130 engaged therewith move axially to bear against the ring 126 for urging the tapered bore 128 thereof against the taper 108.

As shown in the FIGS. 3-12, the slider 122 retains three keys 130 which are circumferentially spaced around and held in position by the circumferential groove 134 in the slider 122. The keys 130 are held in place by the spring 132. When the slider 122 travels axially towards the gear to be engaged, the keys 130 move with the slider 122 with the keys 130 retained within the groove 134. The keys 130 are held between two brass synchro rings 126 that have a tapered bores 128 as already mentioned. The tapered bore 128 of one of the rings 126 is adapted to contact the matching taper 108 on the drive shaft 102. When the brass ring 126 is pushed onto the gear cone taper 108 by the force of the keys 130, the slider 122 and output shaft 114 RPM tries to match the geared drive shaft 102 RPM so as to achieve a smooth transition. Such synchronization of the RPM allows a smoother engagement of the two components of the slider 122 and the geared drive shaft 102 for a transmission.

The present invention thus provides an improved synchronized mechanical shifting transmission system for use in a transmission by way of a hybrid synchronizing/shifting specifically adapted to avoid any problems such as harsh engagement and subsequent rapid wear of the dogteeth requiring frequent replacement of the dog ring and/or slider mechanism.

The invention thus provides an improved service life and performance of transmissions making its use and application more beneficial and efficient for the end user.

What is claimed is:

1. A transmission apparatus, said apparatus comprising:
   a rotatable drive shaft having a first and a second end, said second end of said drive shaft defining a taper and a first portion of a dogtooth device;
   said first portion of said dogtooth device being a face shift having a face tooth;
   a rotatable driven shaft having a first and a second extremity, said driven shaft being selectively driven by said drive shaft, said driven shaft defining a spline;
   a slider drivingly cooperating with said spline, said slider being slidably secured to said driven shaft;
   a second portion of said dogtooth device secured to said slider;
   said second portion of said dogtooth device being a face shift having a further face tooth such that selective engagement of said first and second portions of said dogtooth device is permitted;
   a synchro ring defining a tapered bore, said ring being anchored within said slider such that when said slider is moved towards said taper of said drive shaft, said tapered bore of said ring cooperates with said taper of said drive shaft so that said ring and said slider anchored thereto are rotated and so that said first and second portions of said dogtooth device engage such that said driven shaft is driven by said drive shaft and such that harsh face tooth engagement/loading of said face tooth and said further face tooth is avoided so that a hybrid combination of said dogtooth device and said synchro ring minimizes shock loading and harsh engagement between said slider and said drive shaft;
   said slider defining a groove which is disposed coaxially relative to said driven shaft;
   a fork shift which slidably cooperates with said groove for selectively moving said slider axially relative to said second end of said drive shaft; and
   a key disposed between said slider and said ring such that when said slider is moved towards said second end of said drive shaft, said key presses said tapered bore of said ring against said taper of said drive shaft.

2. A transmission apparatus as set forth in claim 1 wherein said second end of said drive shaft defines a bore for the rotatable reception therein of said first extremity of said driven shaft.

3. A transmission apparatus as set forth in claim 1 wherein said spline extends axially between said first and second extremities of said driven shaft.

4. A transmission apparatus as set forth in claim 1 wherein said slider defines a further spline which slidably cooperates with said spline of said driven shaft.

5. A transmission apparatus as set forth in claim 1 further including:
   a spring for urging said key towards said ring.

6. A transmission apparatus, said apparatus comprising:
   a rotatable drive shaft having a first and a second end, said second end of said drive shaft defining a taper and a first portion of a dogtooth device;
   said first portion of said dogtooth device being a face shift having a face tooth;
   a rotatable driven shaft having a first and a second extremity, said driven shaft being selectively driven by said drive shaft, said driven shaft defining a spline;
   a slider drivingly cooperating with said spline, said slider being slidably secured to said driven shaft;
   a second portion of said dogtooth device secured to said slider;
   said second portion of said dogtooth device being a face shift having a further face tooth such that selective engagement of said first and second portions of said dogtooth device is permitted;
   a synchro ring defining a tapered bore, said ring being anchored within said slider such that when said slider is moved towards said taper of said drive shaft, said tapered bore of said ring cooperates with said taper of said drive shaft so that said ring and said slider anchored thereto are rotated and so that said first and second portions of said dogtooth device engage such that said driven shaft is driven by said drive shaft and such that harsh face tooth engagement/loading of said face tooth and said further face tooth is avoided so that a hybrid combination of said dogtooth device and said synchro ring minimizes shock loading and harsh engagement between said slider and said drive shaft,
   said slider defines an annular groove which is disposed coaxially relative to said driven shaft;
   further including:
   a fork shift which slidably cooperates with said groove for selectively moving said slider axially relative to said second end of said drive shaft; and
   a key disposed between said slider and said ring such that when said slider is moved towards said second end of said drive shaft, said key presses said tapered bore of said ring against said taper of said drive shaft.

7. A transmission apparatus, said apparatus comprising:
   a rotatable drive shaft having a first and a second end, said second end of said drive shaft defining a taper and a first portion of a dogtooth device;
   said first portion of said dogtooth device being a face shift having a face tooth;
   a rotatable driven shaft having a first and a second extremity, said driven shaft being selectively driven by said drive shaft, said driven shaft defining a spline;
   a slider drivingly cooperating with said spline, said slider being slidably secured to said driven shaft;
   a second portion of said dogtooth device secured to said slider;
   said second portion of said dogtooth device being a face shift having a further face tooth such that selective engagement of said first and second portions of said dogtooth device is permitted;
   a synchro ring defining a tapered bore, said ring being anchored within said slider such that when said slider is moved towards said taper of said drive shaft, said tapered bore of said ring cooperates with said taper of said drive shaft so that said ring and said slider anchored thereto are rotated and so that said first and second portions of said dogtooth device engage such that said driven shaft is driven by said drive shaft and such that harsh face tooth engagement/loading of said face tooth and said further face tooth is avoided so that a hybrid combination of said dogtooth device and said synchro ring minimizes shock loading and harsh engagement between said slider and said drive shaft;
   said second end of said drive shaft defining a bore for the rotatable reception therein of said first extremity of said driven shaft;
   said spline extending axially between said first and second extremities of said driven shaft;
   said slider defining a further spline which slidably cooperates with said spline of said driven shaft;

said slider defining a groove which is disposed coaxially relative to said driven shaft;

further including:

a fork shift which slidably cooperates with said groove for selectively moving said slider axially relative to said second end of said drive shaft;

a key disposed between said slider and said ring such that when said slider is moved towards said second end of said drive shaft, said key presses said tapered bore of said ring against said taper of said drive shaft; and a spring for urging said key towards said ring.

* * * * *